Figure 1:
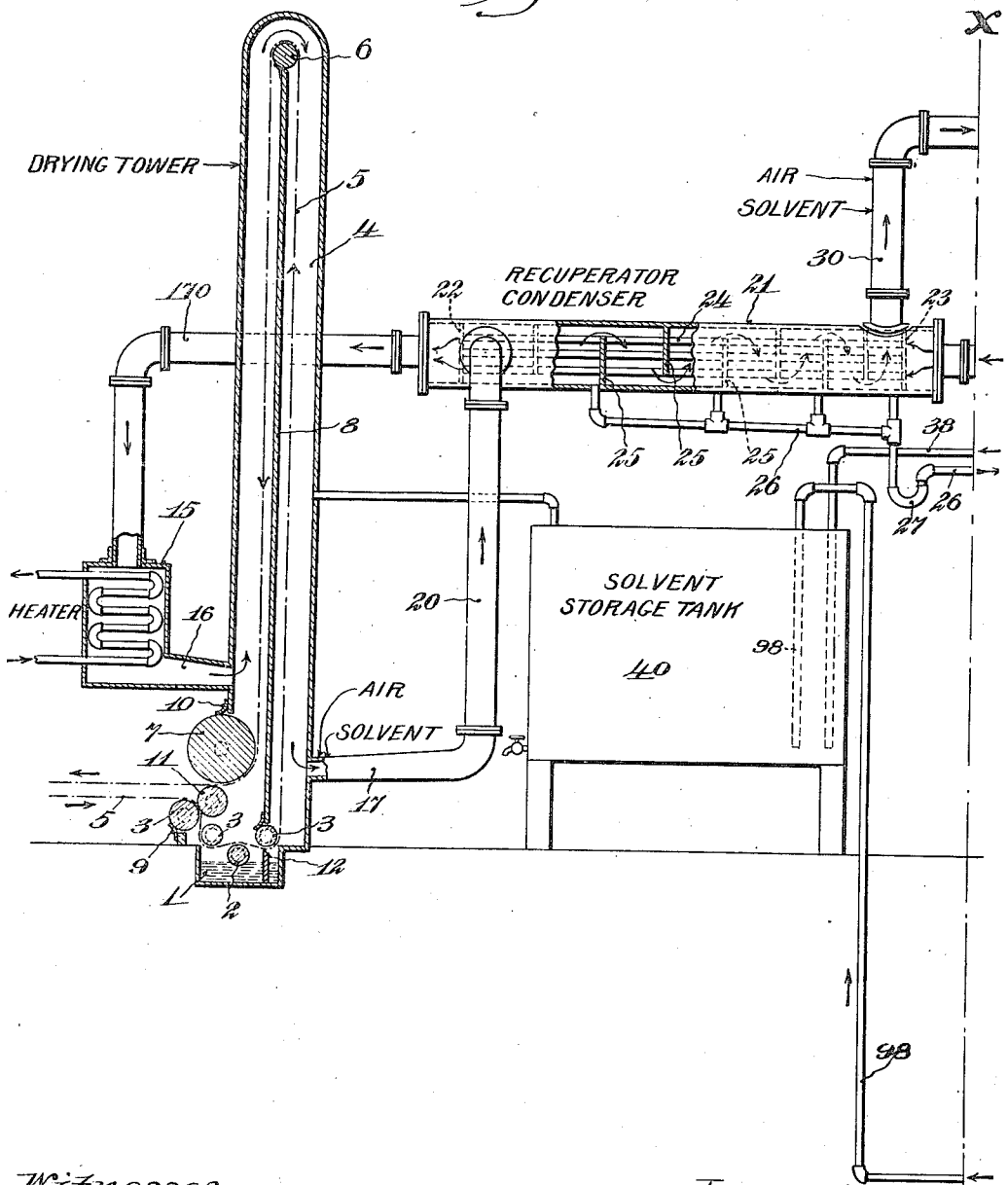

W. E. LUMMUS.
APPARATUS FOR SEPARATING VAPORIZED VOLATILE LIQUIDS FROM GASEOUS MIXTURES.
APPLICATION FILED MAR. 18, 1912.

1,189,711.

Patented July 4, 1916.
3 SHEETS—SHEET 1.

UNITED STATES PATENT OFFICE.

WALTER E. LUMMUS, OF LYNN, MASSACHUSETTS.

APPARATUS FOR SEPARATING VAPORIZED VOLATILE LIQUIDS FROM GASEOUS MIXTURES.

1,189,711.  Specification of Letters Patent.  Patented July 4, 1916.

Application filed March 18, 1912. Serial No. 684,507.

*To all whom it may concern:*

Be it known that I, WALTER E. LUMMUS, a citizen of the United States, residing at Lynn, in the county of Essex and State of Massachusetts, have invented certain new and useful Improvements in Apparatus for Separating Vaporized Volatile Liquids from Gaseous Mixtures; and I do hereby declare the following to be a full, clear, and exact description of the invention, such as will enable others skilled in the art to which it appertains to make and use the same.

The present invention relates to apparatus for the separation by condensation of the vapors of volatile liquids which are mixed with the so-called permanent gases or gases which are liquefiable with much more difficulty than the vapors of the volatile liquids which it is sought to remove.

While the present invention may be employed to condense and separate the more condensable constituents from any vapor or gas mixture within the limits of the power of the apparatus employed to liquefy such condensable constituents, the present invention is more particularly applicable for the separation of the volatile oils which exist in a gaseous or vaporized condition in natural gas, for the removal of tars and volatile constituents of the products of destructive distillation such as illuminating gas, wood gas and the like, and for the recovery of the volatile solvents used in applying coats of varnish or lacquer.

Natural gas, as it issues from the wells, usually contains more or less gasolene, benzin and and similar volatile oils existing in a gaseous condition, and which because of their volatile nature, cannot be readily liquefied and separated from the relatively more permanent gases of the natural gas mixture. As these oils have a considerable commercial value, it is desirable to separate them in a liquid form from the natural gas.

The gaseous products of destructive distillation, such as the destructive distillation of coal or wood, contain in a vaporized condition certain constituents which it may be desirable to remove either for their own value or for the sake of purifying the gas.

Lacquers, varnishes and similar preparations are solutions of gums or similar substance dissolved in volatile solvents to permit of application to the objects to be coated, and the value of the solvents lost by evaporation in the drying of the objects to be coated, is with large establishments so considerable as to invite attentive consideration; for example, in the manufacture of coated cloths,—oil cloth and the like,— the coating material is dissolved in the mixture of amylacetate and gasolene. This solvent is of not inconsiderable value and its recovery a material saving in the cost of operation of the establishment.

The object of the present invention is to produce an apparatus for use in condensing and separating the vapors of volatile liquids from gaseous mixtures in which said vapors are mixed with other and less condensable gases. When a gas under a high pressure is expanded in an expanding engine which transforms the heat energy of the expanding gas into mechanical energy, the gas is cooled to such a low temperature that vapors which at all ordinary temperatures remain in a gaseous condition are often condensed and even frozen in the engine, so that the engine is rendered very inefficient or even stopped. Such "freezing" of an expanding engine is often seen in tools driven by compressed air such as pneumatic drills and the like.

Another object of the present invention is to produce an apparatus such that a gas under comparatively high pressure may be expanded without having its temperature reduced to such a low point as to freeze its vapor. This object is attained in the expanding engine shown in the preferred embodiment of the present invention, by expanding the compressed gas in stages and allowing it to absorb heat between the stages of its expansion.

With the above objects in view, the present invention consists in the apparatus hereinafter described and particularly pointed out in the claims.

While the present invention may be practised in condensing the least volatile constituents of a wide variety of gaseous mixtures and may be embodied in various kinds of apparatus particularly adapted to cope with the conditions imposed by any particular gaseous mixture to be treated, yet, for the purpose of illustrating a complete operative structure, the present invention is illustrated and described as embodied in an apparatus for recovering the solvents used in coating cloth with lacquer, varnish and the like. It is to be distinctly understood, however, that the present invention is not limited to the preferred embodiment herein specifically illustrated and described, but is equally applicable for many other purposes and may be embodied in a wide variety of apparatus within the purview of the invention as defined in the claims.

While it is known that all of the formerly so-called permanent gases, such as oxygen, nitrogen, etc., are liquefiable under extreme conditions of pressure and cold, and there is therefore no real physical line of demarcation between a vapor of a so-called volatile liquid and a gas which is relatively more difficult to liquefy, yet, for the purpose of distinguishing the constituents of a gaseous mixture, which on the one hand can be liquefied, from the constituents, which on the other hand cannot be liquefied in an apparatus like that of the present invention, the term "vapor" is employed in the following specification and claims to designate the constituents of the mixture which are the vaporized volatile liquids sought to be condensed, and the term "gas" is employed to designate the constituents of the mixture which are not sought to be condensed and which are discharged from the apparatus after the "vapor" has been separated therefrom by condensation. The term "gas-vapor mixture" is employed to define the mixture to be treated, which is composed of the "vapor" of the volatile liquids to be condensed, and the "gas" which cannot be condensed in the apparatus. The "gas-vapor mixture" passes into the apparatus, the vapor is separated by condensation and drawn off as liquid and the "gas," which acts as an inert carrier for the vapor, is discharged, containing only traces of the "vapor" which it has been impossible or impracticable to entirely separate from the "carrier-gas." In the preferred embodiment of the invention hereinafter specifically illustrated and described, the evaporated solvent is the "vapor" to be condensed; and the air in which the solvent vapor is absorbed is the "gas" or "carrier"; the "gas-vapor mixture" is more specifically designated as the "air-solvent mixture," or "the "carrier-solvent mixture." In the treatment of coated cloth air is preferably employed as the gaseous carrier for the solvent vapors so that in the following specific description of the preferred embodiment of the present invention the more specific term "air-solvent mixture" is applied to mixture to be treated. It is understood, however, that carrier gases other than air might be employed, so that the terms "carrier-solvent mixture" and "gas-vapor mixture" as used in the specification and claims are intended to define respectively a mixture of a solvent in any gas and a mixture of the vapor of any liquid in any gas.

The preferred apparatus used for performing my improved method is illustrated in the accompanying drawings, in which—

Figure 2:
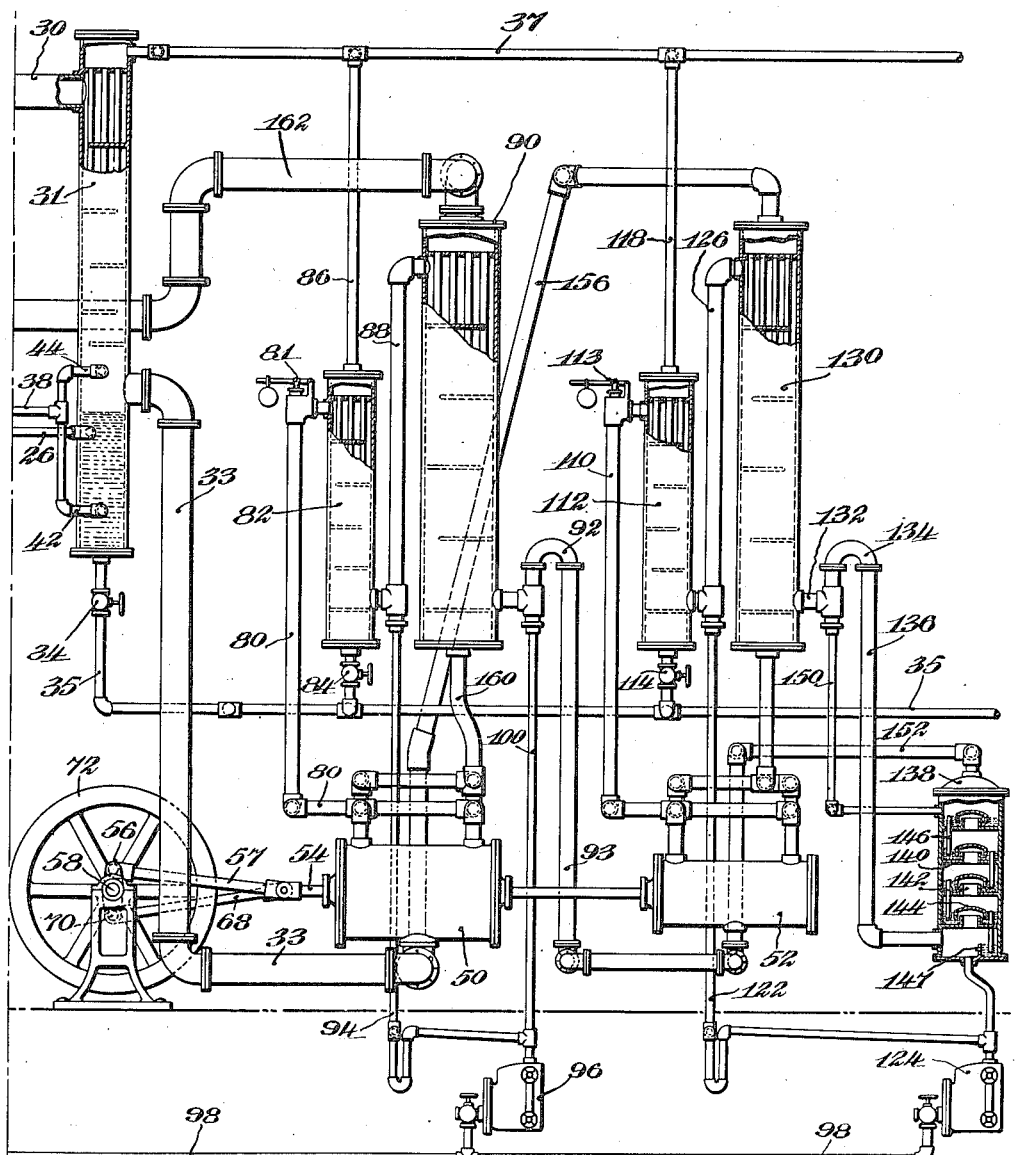
Figure 3:
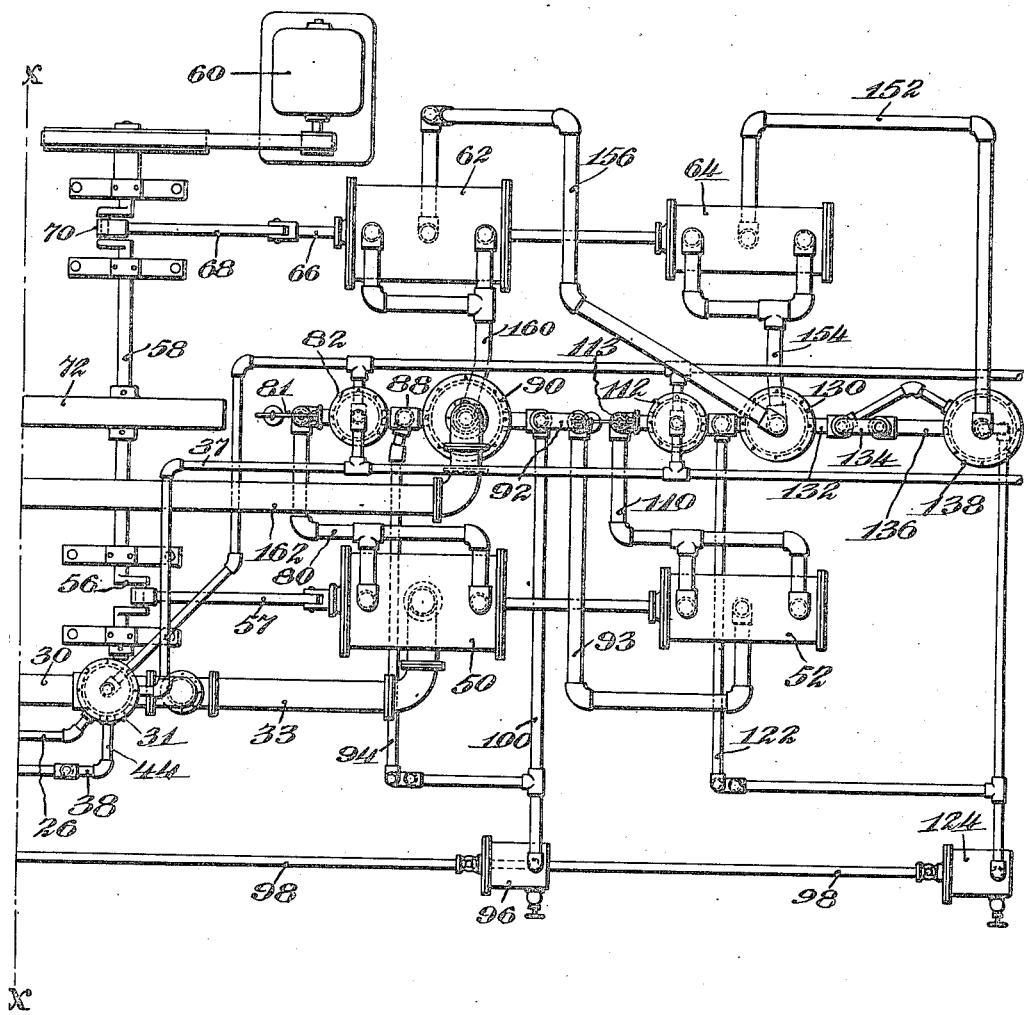

Figures 1 and 2 are side elevations, partly in section, of the left and right hand portions respectively of the apparatus and Fig. 3 is a plan view of the portion illustrated in Fig. 2.

The line of juncture of the two portions, designated as the left and right hand portions, is marked x—x on each of the figures of the drawings. In this connection attention is directed to the fact that in Fig. 2 the floor line is lower than in Fig. 1, for the purpose of greater convenience in illustrating the air compressor and its connections.

Precedent to a description of the method which forms the subject of this invention, the apparatus illustrated in the accompanying drawings will be first briefly described and then described with greater particularity and detail, and then the method will be more easily apprehended than if it were attempted in the first place to describe the method as an abstract series of acts performed upon the gaseous mixture to be treated.

The particular apparatus illustrated in drawings is intended for coating cloth, such as oil cloth or imitation leather, for example.

In general, the operation of the apparatus is as follows: The cloth is introduced into a coating machine and coated on one side with the coating mixture. The cloth then passes through a drying tower in the opposite direction to a current of previously used, purified and warmed air, to which the coated cloth is exposed for the purpose of drying the coating. This is in fact a process of evaporating the coating solvent. The air from the drying tower is then carried to a recuperator condenser, where it is cooled and where also a small portion of the solvent is sometimes condensed and drawn off. From the recuperator condenser the air-solvent mixture is led into a water cooled condenser in which more of the solvent vapor may be condensed, and in which the air-solvent mixture is cooled before it passes to the compressor. The liquid solvent collected in the cooler condenser, together with the liquid from the recuperator condenser, is cooled in the lower part of the cooler condenser, before it is drawn off to the solvent storage tank. From the cooler condenser the air-solvent mixture which contains the solvent vapors which were not condensed and liquefied in the cooler condenser is led to an air compressor where it is compressed in two stages. The compressed mixture discharged from the low pressure cylinder of the air compressor is led through two condensers, for convenience designated as the low stage pressure cooler and the low stage pressure refrigerator respectively, before it enters the high pressure cylinder of the condenser. The pressure cooler is a water cooled condenser and absorbs a large amount of heat from the mixture before it passes to the pressure refrigerator. The refrigerator is a condenser cooled by the cold expanded purified air exhausted from the low pressure cylinder of the expanding engine hereinafter described and cools the mixture to a low temperature, before it is further compressed in the high pressure cylinder of the compressor. From the high pressure cylinder of the compressor the mixture passes through two condensers similar to the low stage pressure cooler and the low stage pressure refrigerator, and which for convenience of nomenclature are spoken of as the high stage pressure cooler and high stage pressure refrigerator. The high stage pressure cooler, like the low stage pressure cooler, is a water cooled condenser, and absorbs a large part of the heat from the compressed mixture discharged from the high-pressure cylinder before it passes into the high-stage pressure refrigerator. The high-stage pressure refrigerator is cooled by the cold expanded purified gas exhausted from the high pressure cylinder of the expanding engine, and the mixture as discharged from the pressure refrigerator is cooled to a low temperature. The cold compressed mixture as it leaves the high-stage pressure refrigerator still contains more or less of the solvent which remains in suspension in the air in the form of fog or mist. The air with the entrained vapor fog is led from the high-stage pressure refrigerator to a washing column or tower in which the suspended vapor particles are washed from the air and liquefied. The solvent liquefied in the pressure coolers, pressure refrigerators and washing column is drained off through suitable traps to the solvent storage tank. This washing operation is the final step in the condensation and liquefaction of the solvent vapor, and removes all of the eliminable solvent from the air, so that the air as discharged from the washing tower is clean or desaturated, containing only a very small per cent. of the total solvent which it absorbs in the drying tower. The clean purified air from the washing column contains so little solvent that any further attempt at recovery is impracticable. However, the air discharged from the washing column is very cold and is under a comparatively high pressure, so that if it is expanded adiabatically it will not only furnish power to assist in driving the air compressor, but is also particularly adapted after expansion to be used as the refrigerating medium to cool the air-solvent mixture in the pressure refrigerators. With these objects in view, the clean or desaturated air from the washing column is led to the high pressure cylinder of a two stage expanding engine in which it is adiabatically expanded. This expansion reduces the temperature of the air far below its temperature in the washing column. The cold expanded air is discharged from the high-pressure expanding cylinder into the high-stage pressure refrigerator, where it acts as the cooling medium. The partially expanded air, in passing through the high-stage pressure refrigerator, absorbs heat from the air-solvent mixture, and to still further expand and cool the air it is led from the high-stage pressure refrigerator to the second or low-pressure cylinder of the expanding engine in which its pressure is reduced to about atmospheric pressure. The cold expanded air from the low-pressure expanding cylinder is led into the low-stage pressure refrigerator where, acting as the refrigerating medium, it absorbs heat from the air-solvent mixture. From the low-pressure refrigerator the expanded air is led through the recuperator condenser where it absorbs still more heat from the warm air-solvent mixture coming from the drying tower. From the recuperator condenser the desaturated or purified air is led through a heater where it is heated to the proper temperature, and reintroduced into the drying tower. The heated purified air absorbs the solvent vapors in the drying tower, and again passes through the above described cycle of processes.

As illustrated, the purified or desaturated air coming from the washing column through the two expanders and the condensers, in which it acts as the cooling medium, still retains traces of solvent vapor which it is practically impossible to entirely remove. By returning the air to the drying tower this condensed solvent is conserved within the apparatus. Of course if the uncondensed solvent is not worth saving, or if its presence materially reduces the absorptive power of the air when reintroduced into the drying tower, the air after leaving the recuperator condenser may be discharged into a flue or chimney, and a supply of fresh air drawn through the heater into the drier tower.

The apparatus illustrated in the drawings is described in detail as follows: The coating apparatus consists of a trough 1 for the coating material, in which the coating roller 2 runs, and leading rollers 3 for leading the cloth into the position to be coated and to the drying tower 4, which is arranged over the coating apparatus and through which the sheet of cloth passes to be dried. The cloth 5 enters the tower at the bottom, passes over the roller 6 and down on the other side of the tower out under the roller 7. The drying tower is divided by a partition 8, which extends nearly from top to bottom and is provided with weather-strip-like closure at the rollers 6 and 3 at the top and bottom. The entrance and the exit of the cloth are guarded by flexible strips 9 and 10 and the idle roller 11 which stops up spaces between the cloth where it enters and where it leaves the coating and drying apparatus. A knife or slicker 12 regulates and distributes the coating mixture as desired. The partition 8 extends completely across between opposite sides of the drying tower, as do also the coating and guiding rollers which are journaled on each side of the tower. The pure air is heated in a heater 15 to the temperature which is found to be best for drying the particular coating material used, and is introduced into the drying tower through the inlet 16 located near the lower end of the tower. The drying tower is about 30 feet in height. The inlet 16 for the air is substantially the width of the tower, as is also the outlet 17, in order that the air may be distributed over the entire width of the cloth being dried. The direction of the flow of air through the drying tower is counter to that of the movement of the cloth. This contributes to the efficiency of the drying tower, since the pure air from the heater is first passed over that portion of the cloth which is nearly dried of solvent, and then passes along over portions of the cloth from which less and less of the solvent has been evaporated, until the air as it is discharged through the outlet 17 passes over the freshly coated cloth coming up from the trough 1. The temperature of the air as it emerges from the outlet 17 carrying the solvent vapors with it is reduced somewhat below the temperature at which it was introduced through the inlet 16, the reduction in temperature being principally due to the heat absorbed by the evaporation of the liquid solvent from the coating. This air-solvent mixture is led through the pipe 20 to the recuperator condenser 21, and is discharged into the intertubular space thereof. The recuperator condenser comprises a cylindrical shell about 12 inches in diameter having two partitions 22 and 23 at its ends connected by a plurality of small condenser tubes 24. A relatively large heat absorbing surface is thus exposed to the air solvent mixture by employing a large number of small tubes arranged closely together. A series of baffle plates 25 is provided, and the plates are placed nearer together toward the right hand end of the condenser because the volume of the air solvent mixture diminishes as its temperature is reduced by contact with the cooling pipes. Any solvent which is condensed and liquefied by the cooling of the air-solvent mixture in the recuperator condenser is drawn off through a drain pipe 26 connected at a number of points along the bottom of the recuperator condenser and discharged into the bottom of the intertubular space of the cooler condenser. A trap 27 is provided in the drain pipe 26 to prevent the air passing through it. The cooling medium for the recuperator condenser is the cooled returning purified air on its way to the drying tower. It is to be observed that the cool pure air passes through the recuperator condenser to the left, while the air-solvent mixture passing around the tubes moves in a general direction toward the right, or in counter-current fashion to the movement of the cold air, which conduces to the most efficient operation of the condenser, so that the air-solvent mixture discharged at the right-hand end of the recuperator condenser is cooled and the air discharged at the left-hand end of the recuperator condenser is heated. It is because of this interchange of heat between the air and the air-solvent mixture that the term "recuperator condenser" has been chosen as a name to designate this particular condenser.

The air-solvent mixture is led from the recuperator condenser through a pipe 30 to the cooler condenser 31. The cooler condenser is cooled by a stream of water flowing upward through its tubes in counter-current to the air-solvent mixture, which flows downward through the inter-tubular space of this condenser. The cooler condenser is shown arranged vertically, and is of smaller diameter than the recuperator condenser, but in other respects is similar to it, and comprises a plurality of small tubes connecting two oppositely disposed partitions, and having a series of baffle plates interposed between the partitions to direct the air-solvent mixture through a tortuous passage through the intertubular space. There are no baffle plates at the bottom of the condenser, as this space is reserved for the cooling of the condensed solvent in part discharged through the pipe 26 from the recuperator condenser and in part condensed and collected in the upper part of the cooler condenser. The distances between the baffle plates are decreased from the top toward the bottom, as shown. The distances between the baffle plates from the top to the bottom are reduced like the arrangement of the baffle plates in the recuperator condenser. The temperature of the air-solvent mixture is reduced in the cooler condenser to about the temperature of the condenser water, and the air-solvent mixture is discharged from the cooler condenser through the pipe 33 which opens from the side of the cooler condenser a little above the level of the condensed solvent at the bottom. The condenser water is led into the bottom of the cooler condenser through a valve connection 34 from the water supply pipe 35, and is discharged from the top of the cooler condenser into the water discharge pipe 37.

The solvent collected in the recuperator condenser 21 and drained into the bottom of the cooler condenser through the pipe 26, together with an accretion from the upper part of the cooler condenser, is collected in the intertubular space at the bottom of the cooler condenser. The condensed solvent is here cooled to nearly the temperature of the condenser water, and is discharged through a pipe 38 into the solvent storage tank 40. The drain pipe 38 has two connections with the cooler condenser at 42 and 44, below and above the surface of the liquid respectively, for the purpose of preventing syphonic action.

The air solvent mixture coming from the cooler condenser is at atmospheric pressure and at a temperature a little above the temperature of the condenser water, and therefore contains solvent which is not condensable at this pressure and temperature. The air-solvent mixture passing through the pipe 33 from the cooler condenser is discharged into the low-pressure cylinder 50 of a two-stage air compressor, in which it is compressed to a pressure which is determined by the character of the air-solvent mixture. As will later appear, the greater the pressure obtained by the compressor, the greater will be the cooling of the air-solvent mixture in the pressure refrigerators, but there is a certain upper limit beyond which the compression must not go, because if an attempt be made to compress a solvent mixture having a comparatively low flash point or ignition temperature to too great a pressure in a single stage of the compressor, the mixture may take fire and explode. For these reasons it is impossible to state any precise pressure to which the mixture is compressed, as it must be determined by the character of the solvent. The two-stage air compressor comprises the low and high pressure cylinders 50 and 52 respectively, placed in tandem and having their common piston rod 54 driven by the crank 56 of the driving shaft 58 through the pitman 57. The power to turn the driving shaft is furnished partly by an electric motor 60, and partly by an expanding engine which comprises the low and high-pressure cylinders 62 and 64 respectively arranged in tandem and having their common piston rod 66 connected by a pitman 68 to the crank 70 of the driving shaft 58. A comparatively heavy fly wheel 72 is provided to store power, and to keep the air compressor and the expanding engine running evenly. The power to drive the expanding engine is furnished by the cold compressed and purified air, as will be hereinafter more fully set forth. The air-solvent mixture compressed in the low-pressure cylinder 50 is led through a pipe 80 into the top of a condenser 82. A safety valve 81 in the pipe 80 is provided as a precaution against excessive pressures. This condenser, for convenience, has been designated as the low-stage pressure cooler, since in it the compressed air-solvent mixture from the low-pressure condenser cylinder 50 is cooled. The air-solvent mixture discharged from the low pressure cylinder 50 into the pipe 80 may have any temperature up to its flash point.

The condenser 82 is constructed similar to the recuperator condenser and cooler condenser having a large number of condensing pipes therein, and having baffle plates in the intertubular space to direct the air-solvent mixture in a tortuous passage of the intertubular space of the condenser. The air-solvent mixture enters at the top of the pressure cooler and passes downward through the intertubular space. The pressure cooler is cooled by water which passes into the bottom of the condenser through a valve 84 from the water supply pipe 35 and is discharged through a valve to the water discharge pipe 37. The air-solvent mixture passing through the low stage pressure cooler 82 is under the pressure given it in the low pressure cylinder of the compressor and more of the solvent vapor will be condensed and liquefied because an increase in pressure is one of the factors causing condensation of a vapor. The solvent condensed and collected in the low stage pressure cooler is drawn off through a trapped drain pipe 94 to the trap 96 and thence through the pipe 98 to the solvent storage tank 40. Since liquid solvent in the pipe 94 is under pressure it is necessary to reduce its pressure to nearly that of the atmosphere before it is discharged into the pipe 98 leading to the tank 40. For this purpose the trap 96 is constructed to allow the passage of the liquid solvent and to discharge it at about atmospheric pressure into the pipe 98 but to prevent the passage of any air or vapor. A trap of the type known to the trade as a continuous balanced float trap or steam trap is preferably employed. This trap allows the passage of the liquid solvent but does not allow the air or vapor to pass into the pipe 98. The air-solvent mixture is discharged from the bottom of the low stage pressure cooler 82 through a pipe 88 which leads it into the top of another condenser which has for convenience been designated as the low stage pressure refrigerator, because in this condenser the air-solvent mixture compressed in the low-pressure cylinder 50 and cooled in the low stage pressure cooler 82 to a temperature about that of the condenser water is supercooled. The drop in temperature in the purified gas caused by its expansion in the expanding engine is sufficient to maintain the temperature of the two pressure refrigerators at a temperature below 0° centigrade and the term "low temperature" as hereinafter used in the specification and claims is intended to define a temperature below 0° centigrade. The expression "supercool" as used in the specification and claims is intended to define the step of the operations in which the gas-vapor mixture, already cooled in one condenser, is cooled still further by being passed into a second condenser maintained at a lower temperature than said first condenser, and, unless otherwise qualified, the supercooling is not necessarily to a temperature below 0° centigrade. The low stage pressure refrigerator is constructed similar to the previously mentioned condensers, having a number of condenser tubes and baffle plates. The air-solvent mixture passes downwardly through the intertubular space of the low stage pressure refrigerator, and is discharged through an inverted U-shaped connection 92 into the pipe 93 which leads to the high pressure cylinder 52 of the compressor. The pressure refrigerator 90 is cooled to a low temperature by the expanded air coming from the low stage expanding cylinder 62, so that in the low stage pressure refrigerator 90 the air-solvent mixture is subjected both to pressure and to low temperature. Both of these factors combine to condense still more of the uncondensed solvent vapor. The solvent vapor condensed and collected in the pressure refrigerator 90 is drained off through a pipe 100 into the balance float trap 96, and thence to the solvent storage tank.

The partially compressed air-solvent mixture coming from the low-stage pressure refrigerator through the pipe 92 is given its final compression in the high-pressure cylinder 52 of the air compressor. The degree of compression to which the air-solvent mixture is subjected in the high pressure cylinder will be determined, like that in the low pressure cylinder, by the degree of refrigeration desired and the flash point of the particular air-solvent mixture which is to be treated by the apparatus. While, for the above reasons, no fixed rule can be stated as to the degree of compression, yet in the treatment of certain solvents the pressure of the final stage of compression may be carried to over one hundred pounds per square inch. The air-solvent mixture by its compression in the high pressure cylinder 52 is raised in temperature and after it is discharged from the high pressure cylinder it is led through a pipe 110 to a water cooled condenser 112 which has been designated for convenience as the high-stage pressure cooler in which a large part of the heat of the air-solvent mixture is absorbed by the condenser water. A safety valve 113 is provided to guard against excessive pressure in this part of the apparatus. The high-stage pressure cooler is similar in construction to the low-stage pressure cooler 82 except that it may be made somewhat smaller since the volume of the air-solvent mixture is reduced by compression and condensation and the condenser should be made of stronger construction to withstand the increased pressure. The condenser water enters through a valve 114 from the water supply pipe 35 into the bottom of the condenser and is discharged from the top of the condenser through a pipe 118 into the water outlet pipe 37. The solvent condensed and collected in the high-stage pressure cooler 112 is led through a trapped drain pipe 122 to a balance float trap 124 and thence through the pipe 98 to the solvent storage tank 40. The cooled compressed air-solvent mixture from the high-stage pressure cooler 112 passes through a pipe 126 to the high-stage pressure refrigerator 130 in which it is supercooled to a low temperature by the returning purified air from the exhaust of the high pressure cylinder 64 of the expanding engine. The high-stage pressure refrigerator 130 is similar in construction to the low-stage pressure refrigerator 90 except that it may be smaller and should be of stronger construction because of the decreased volume and increased pressure of the air solvent mixture. Incidentally it is to be noted that, since the cold air in the condenser tubes of the high-stage pressure refrigerator is under pressure, the walls of the condenser tubes may be made thinner than would be possible in case the cooling medium in the condenser tubes was not under pressure. Also by having the most highly compressed air-solvent mixture cooled by the most highly compressed purified air and the less compressed mixture cooled by the less compressed, or, in other words, by utilizing the expanded air after each downward stage of expansion to cool the compressed air-solvent mixture after the succeeding upward stages of compression taken in their inverse order, both the mixture and the air passages of the high stage pressure refrigerator may be made smaller than in the low stage-pressure refrigerator, which makes the far best arrangement of the pressure refrigerators both in construction and operation. In all of the pressure condensers 82, 90, 112, 130, a large number of condensing pipes are used and the walls of these pipes are made as thin as is consistent with safety so as to allow the greatest possible exchange of heat between the cooling medium and the mixture to be condensed. The air-solvent mixture after passing downward through the intertubular space of the condenser 130 is discharged at 132 near the bottom of the condenser. The cold compressed air-solvent mixture discharged from the condenser 130 is led up through an inverted U pipe 134 to separate it from the liquid solvent and is then led through the pipe 136 to the bottom of the washing column 138. The washing column consists of a cylindrical shell having a number of decks or diaphragms 140 extending across it. From the decks 140, riser pipes 142 extend upwardly and are covered by caps or hoods 144 which extend down over the riser pipes. Drain pipes 146 extend through the decks to conduct the condensed liquid downwardly. The depth of the liquid on the decks 140 is determined by the distance that the overflow pipes project above the decks. Each overflow pipe extends downwardly to nearly the top of the deck below so that the bottom of each of the overflow pipes is sealed by the liquid standing on the deck below to prevent the upward passage of the air through the overflow pipes.

A dam 147 extends across one side of the bottom of the washing column to retain liquid to seal the lower end of the overflow pipe of the lowermost deck. The top deck of the washing column 138 is supplied with the liquid solvent collected in the high-stage pressure refrigerator through the drain pipe 150. The condensed solvent collects on the decks 140 so that the air-solvent mixture which passes upward through the washing column 138 bubbles out beneath the edges of the hoods 144 and a thorough washing of the air-solvent mixture by the liquid solvent is assured. The air-solvent mixture coming from the high-stage pressure refrigerator 130 is at a high pressure and a low temperature so that practically all of the solvent is condensed. However, some of the condensed solvent usually persists in the form of a mist or fog and it is for the purpose of recovering this mist or fog that the air-solvent mixture is subjected to the repeated washings in the washing column 138. While any form of cap or hood 144 which will insure an even distribution of the vapor around its edge may be used, the form of cap or hood disclosed in the patent to Walter E. Lummus for boiling caps, No. 973,795, October 25, 1910, is preferred. The washing column 138 is not an absolutely necessary element of the apparatus but is a valuable adjunct or addition employed to secure a more thorough removal of the solvent.

The air-solvent mixture discharged at the top of the washing column 138 is very cold, under a high pressure and is desaturated of the eliminable solvent. The air in this condition has been spoken of in the general description as the returning clean or purified air. This clean cold compressed air is led from the washing column 138 through the pipe 152 to the high pressure cylinder 64 of the expanding engine in which it is expanded adiabatically, the heat being expended in the form of mechanical energy to turn the driving shaft 58 and assist the motor 60. The partially expanded air, which is very cold, being reduced by adiabatic expansion to a temperature considerably lower than the temperature at which it was introduced into the expanding cylinder 64, is led through a pipe 154 to the high-stage pressure refrigerator 130 where it acts as the cooling medium. The air passes upwardly through the tubes of the pressure refrigerator, is discharged at the top and passes down through a pipe 156 to the low pressure cylinder 62 of the expanding engine. In the cylinder 62 the air is adiabatically expanded to a pressure about that of the atmosphere and is led from the exhaust of the cylinder 62 through a pipe 160 to the bottom of the low-stage pressure refrigerator 90 through the condensing tubes of which it passes upwardly and is discharged into the pipe 162. The returning air as it passes through the high-stage pressure refrigerator 130 absorbs heat from the air-solvent mixture so that, although still comparatively cold, it is warmer than when exhausted from the high pressure cylinder 64. The adiabatic expansion in the cylinder 62 of the air coming from the high-stage pressure refrigerator 130 again cools it to a low temperature so that when it passes through the condenser tubes of the low-stage pressure refrigerator 90 it is a very cold cooling medium. The expanded air discharged into the pipe 162 is led through it to the recuperator condenser 21 through the condenser tubes 24 passing from right to left. In the recuperator condenser there is, as before mentioned, an interchange of heat between the warm air-solvent mixture from the drying tower and the cool returning purified air so that the returning air absorbs considerable heat and is led from the recuperator condenser 21 through a pipe 170 to the heater 15 where it is heated still more before being introduced into the drying tower.

In the above specific description, the apparatus has been described following the closed circuit of the circulation of the air from the drying tower through the various condensers and compressors to the washing column and then back through the various expanders and condensers to the drying tower again. During the operations upon the air-solvent mixture up to the time the air is discharged from the washing column the air acts as an inert carrier for the solvent vapors. After the air is discharged in a purified condition from the washing column, the air acts both as a motive fluid for the expanding engine and as a refrigerating medium for the two pressure refrigerators and the recuperator condenser.

To more readily present the essential features of the present invention, the drawings are shown as illustrating the apparatus in a diagrammatic form rather than illustrating the exact details of the mechanical construction. For example, the connections with the cylinders of the air compressor and the expanding engine are indicated diagrammatically and the various slide valves and their actuating mechanism which are necessarily involved in the use of such compressors and expanding engines are not shown. Nevertheless the operation of the compressor and the expanding engine will be readily understood by those skilled in the art. While a two stage compressor and a two stage expanding engine are illustrated, a single stage compressor and expanding engine or compressors and expanding engines of more than two stages may be used depending upon the circumstances. However, there are certain advantages attained by compression and expansion in a plurality of stages. Viewing the compression as an operation alone, compression in a plurality of stages with cooling between stages possesses the important advantages that a high final pressure can be attained without raising the temperature of the gas-vapor mixture dangerously near its flash point at any of the series of stages of compression, and that less power will be consumed, because the average temperature of the gas during the entire compressing operation is kept lower than the average temperature could be kept if the entire compression took place in a single stage. Viewing the compression and expansion as interdependent and coöperating operations, the plurality of stages of compression and expansion allows a more gradual and economical interchange of heat to take place between the compressed gas-vapor mixture and the expanded gas. As illustrated, the warm gas-vapor mixture from the compressor cylinders can be cooled in water cooled condenser and then supercooled by the expanded gas in another condenser. By extracting the heat of the gas-vapor mixture in a number of stages each stage consisting of the absorption of heat by some external cooling medium such as water and the further absorption of heat by the expanded gas, a very low temperature can be reached in the final stage supercooling. Viewing the expansion of the compressed gas as an operation alone and particularly as an operation for the conversion of the energy of the compressed gas into mechanical motion, expansion by stages with absorption of heat between the stages not only avoids such low temperatures as interfere with the operation of the expanding engine by causing condensation and freezing in the engine of vapors entrained in the gas, but also allows the expanding gas to do a greater amount of mechanical work than if it were expanded in a single stage. If a single stage expansion were to take place with a gas under high pressure, the sudden cooling by expansion might be so great as to freeze less volatile vapors and clog the expanding engine, but by expanding by stages the cold expanded gas from one stage absorbs enough heat before its expansion in the next lower stage so that the temperature during any stage of expanding does not drop so low as to interfere with the mechanical operation of the expanding engine.

In an apparatus like that illustrated it would probably be impossible to expand the cold compressed gas in a single stage without causing such a very low temperature as to freeze in the engine cylinder vapors more volatile than those condensable in the condensers. The absorption of heat by the cold gas exhausted from one cylinder before it enters the cylinder of the next lower stage increases the ability of the gas to do mechanical work in the cylinder of the next lower stage and therefore the expansion by stages with absorption of heat between the stages produces more mechanical work than the expansion of the same gas in a single stage. Where the principal object of the expansion is, like that of the illustrated apparatus, a thermal one, namely the cooling for the purposes of condensation of a gas-vapor mixture, the only heat absorbed by the expanded gas is taken from the gas-vapor mixture, but when the principal object of the expansion of a gas is a mechanical one, namely, the conversion into mechanical motion of the energy to be derived from a given volume of compressed gas, the gas between its stages of expansion might be allowed to absorb heat from any convenient external medium, and it will be evident that the greater the amount of heat absorbed during the entire operation of expanding the gas, the greater will be the amount of mechanical work done by the expanding engine. This feature of the invention, namely expansion by stages, may be equally well employed in any kind of apparatus where a highly compressed gas, such as compressed air, is expanded and does mechanical work.

While in the illustrated embodiment the vapor-gas mixture, more specifically designated as the air-solvent mixture, is led through four different types of condensers, viz., the recuperator condenser, the cooler condenser and the pressure coolers and pressure refrigerators, the employment of all of these types of condensers is not essential to all forms of apparatus in which the present invention may be embodied and one or more of the condensers may be omitted within the purview of the invention in its broader aspects. For example, in an apparatus for liquefying the volatile oils from natural gas, since the gas as it issues from the well is cool, the condensers like the recuperator condenser and cooler condenser may with advantage be dispensed with. Neither is the employment of condensers of the exact type illustrated deemed essential; therefore when the word "condenser" alone is used in the specification and claims, it is intended to be understood in its broad sense and is not intended to define any particular type of the condensers illustrated. Moreover, condensers like the pressure refrigerators as illustrated, in which there is a direct transfer of heat through the tube walls between the gas-vapor mixture and the expanded gas, are not essential to the transfer of heat from the gas-vapor mixture to the expanded gas, and the employment of some circulating heat carrying medium such as a brine which is cooled in a separate container by the expanded gas and is piped into the refrigerator condenser to act as the refrigerating medium for the gas-vapor mixture, is within the purview of the invention.

The statement in the specification and claims that the expanded gas is utilized for cooling the compressed gas-vapor mixture is intended to apply to a method or apparatus in which the expanded gas is used as the direct refrigerating medium for the gas-vapor mixture or in which the heat from the gas-vapor mixture is transferred to the expanded gas by means of some intermediate heat transferring medium such as brine. Neither is it essential, in the present invention viewed in some of its broader aspects, that the brine be cooled by the expanded gas as it may be cooled by some refrigerating apparatus entirely independent and separate from the means for expanding the compressed gas.

Some gas-vapor mixtures which are to be treated may contain vapors which when treated alone cannot be condensed (from the mixture) at the pressures and temperatures within the practicable attainments of the apparatus. Many of these vapors may, however, be condensed if they are mixed with the vapor of some more readily condensable substance such as high boiling oils and the like which can be condensed in the apparatus and which act in the nature of catalytic agents to assist in the condensation of the more difficultly condensable vapors. In such cases condensation assisting substances such as high boiling oils and the like may be added by injection or otherwise to the gas-vapor mixture to facilitate the recovery of the said more volatile constituents thereof.

As the gas-vapor mixture passes through the various condensers and refrigerators, the volatile constituents thereof are successively condensed and removed in the order of their condensability so that selective condensation takes place in the various condensing chambers. It will be evident that if the various condensing chambers are tapped off to separate collecting tanks that a selective condensation of the various volatile liquids forming the vapor may be had.

As illustrated in the preferred embodiment of the present invention, the heat absorbing capacity of the expanded purified gas is distributed in a plurality of refrigerators, each being arranged to supercool the compressed gas-vapor mixture after the successive stages of compression, and, as above pointed out, a selective condensation of the volatile constituents of the gas-vapor mixture takes place. Under certain circumstances it may be desirable instead of utilizing the heat absorbing capacity of the purified expanded gas in a number of refrigerators, to utilize the entire heat absorbing capacity in a single refrigerator and thereby to attain the lowest possible temperature. When it is desired to utilize the entire heat absorbing capacity of the expanded gas in a single refrigerator, the purified compressed gas is expanded, either in a single stage expanding engine or in a multiple stage expanding engine, in which the gas is led directly from one expanding cylinder to another without the opportunity to absorb heat between its successive expansions, and the expanded gas is led through a single refrigerator corresponding to the high stage pressure refrigerator 130 of the drawings in which the compressed gas-vapor mixture is subjected to the lowest temperature attainable by expanding the purified gas. In such a modified form of apparatus the gas-vapor mixture is subjected to a single refrigeration which condenses and removes all volatile constituents not condensable at the temperature of the condenser water, as contrasted with the multiple stage refrigeration and selective condensation of such volatile constituents which takes place when the compressed gas-vapor mixture is passed successively through two or more refrigerators cooled by the expanded gas. It will be evident that in this manner a much lower temperature can be attained and that vapors can be condensed which might be too volatile to be condensed when the heat absorbing capacity of the expanded gas is distributed in a number of separate refrigerators.

While the expanding engine has been illustrated as an engine having a piston reciprocating in a cylinder, it is to be understood that any form of expanding engine may be employed; for instance, the purified air might be expanded through a turbine which would extract part of the heat in the form of mechanical energy or the expanded purified air might be cooled by being expanded through a needle valve or fine opening or openings to cause a reduction in the temperature due to what is known as the Joule-Thomson effect of expanding a gas through a fine opening or porous plug. However, since an adiabatic expansion causes a much greater drop in temperature than the expansion through a fine opening due to the Joule-Thomson effect, an expansion adiabatic so far as practicable is preferred. Of course the expansion through any sort of engine is not perfectly adiabatic but the term adiabatic as used in the specification and claims is to be understood as defining an expansion in which more or less of the heat energy is transformed into mechanical energy depending upon the efficiency of the expanding engine. While from the point of view of the conservation of mechanical energy within the apparatus it is preferable, as illustrated, to utilize the mechanical energy of the expanding engine to drive the compressor, yet the mechanical energy of the expanding engine might be otherwise utilized or even thrown away without affecting the thermal relation of the expanding engine to the rest of the apparatus.

Of course if the gas-vapor mixture to be treated is already under pressure, the compressor can be omitted and the gas-vapor mixture be passed directly, without further compression, into a condenser or condensers and then expanded, and the expanded purified gas utilized for cooling the condenser or one of the condensers.

While some of the modifications, which might be made in the apparatus specifically described and illustrated, have been indicated, many other changes or omissions may be made in the arrangement of said apparatus within the purview of the invention as defined in the following claims:—

1. An apparatus for separating vaporized volatile liquids from gaseous mixtures having, in combination, means for compressing the gas-vapor mixture, means for cooling the compressed gas-vapor mixture to condense the vapors, and means for washing the cooled compressed gas-vapor mixture, substantially as described.

2. An apparatus for separating vaporized volatile liquids from gaseous mixtures having, in combination, means for compressing the gas-vapor mixture, means for cooling the gas-vapor mixture to a low temperature to condense the vapors, and means for washing the cooled compressed gas-vapor mixture, substantially as described.

3. An apparatus for separating vaporized volatile liquids from gaseous mixtures having, in combination, means for compressing the gas-vapor mixture, means for cooling the compressed gas-vapor mixture, means for washing the cooled compressed gas-vapor mixture, and means for expanding the washed and purified gas, the expanded gas being utilized to absorb the heat taken from the compressed gas-vapor mixture by the said cooling means, substantially as described.

4. An apparatus for separating vaporized volatile liquids from gaseous mixtures having, in combination, means for compressing the gas vapor mixture, means for cooling the gas-vapor mixture to a low temperature to condense the vapors, and means for adiabatically expanding the purified gas against a piston in a plurality of stages, the expanded purified gas being utilized to absorb the heat taken from the gas-vapor mixture by the said cooling means, substantially as described.

5. An apparatus for separating vaporized volatile liquids from gaseous mixtures having, in combination, means for compressing the gas vapor mixture, means for supercooling the cooled gas-vapor mixture to a low temperature to condense the vapors, and means for expanding the purified gas in a plurality of stages, the expanded purified gas being utilized to absorb the heat taken from the gas-vapor mixture by the said supercooling means, substantially as described.

6. An apparatus for separating vaporized volatile liquids from gaseous mixtures having, in combination, means for compressing the gas-vapor mixture in a plurality of stages, means for cooling the compressed gas-vapor mixture after each stage of compression, and means for expanding the purified gas in a plurality of stages, the expanded purified gas after the several stages of expansion being utilized to absorb the heat taken from the compressed gas-vapor mixture by the said cooling means after the several stages of compression, substantially as described.

7. An apparatus for separating vaporized volatile liquids from gaseous mixtures having, in combination, means for compressing the gas-vapor mixture in a plurality of stages, means for cooling the compressed gas-vapor mixture after each stage to condense the vapors, and means for expanding the purified gas in a plurality of stages equal in number to the stages of compression, the expanded purified gas being utilized after each succeeding upward step in expansion to cool the compressed gas-vapor mixture after each of the succeeding downward steps of compression taken in their inverse order, substantially as described.

8. An apparatus for separating vaporized volatile liquids from gaseous mixtures having, in combination, means for compressing the gas-vapor mixture in a plurality of stages, means for cooling the compressed gas-vapor mixture after each stage of compression, means for supercooling the compressed gas-vapor mixture after each cooling operation to condense the vapors, and means for expanding the purified gas in a plurality of stages, the expanded purified gas being utilized to absorb the heat taken from the compressed gas-vapor mixture by the said supercooling means, substantially as described.

9. An apparatus for separating vaporized volatile liquids from gaseous mixtures having, in combination, means for compressing the gas-vapor mixture, means for cooling the compressed gas-vapor mixture after each stage of compression, means for supercooling the compressed gas-vapor mixture to a low temperature after each of said cooling operations to condense the vapors, and means for adiabatically expanding the purified gas in a plurality of stages, the expanded purified gas being utilized to absorb the heat taken from the compressed gas-vapor mixture by said supercooling means, substantially as described.

10. An apparatus for recovering solvents having, in combination, a collector having a pure-carrier inlet and a carrier-solvent mixture outlet, in which the solvent-containing material is exposed to the action of the carrier which absorbs the solvent from the solvent-containing material, a cooler in which the carrier-solvent mixture is cooled, a compressor, connections between said condenser and the compressor, a condenser in which the compressed carrier-solvent mixture is cooled to a low temperature to condense the solvent, connections between the compressor and said second condenser, an expanding engine, connections between said second condenser and the expanding engine, and connections between the expanding engine and the pure-carrier inlet of the collector for returning the purified carrier for re-use, the expanded purified carrier being utilized for cooling the compressed carrier-solvent mixture, substantially as described.

11. An apparatus for separating vaporized volatile liquids from gaseous mixtures, having, in combination, means for compressing the gas vapor mixture, means for cooling the compressed gas vapor mixture to a low temperature to condense and separate the vapors, and means to liquefy and absorb the vapor condensate in the form of a fog in the compressed gas vapor mixture, substantially as described.

12. An apparatus for separating vaporized volatile liquids from gaseous mixtures, having, in combination, means for compressing the gas vapor mixture, means for cooling the compressed gas vapor mixture to a low temperature to condense the vapors, and means to pass the compressed cooled gas vapor mixture through a condensate solution to absorb vapor condensate in the form of a fog, substantially as described.

13. An apparatus for separating vaporized volatile liquids from gaseous mixtures, having, in combination, means for compressing the gas vapor mixture in stages, means for cooling the gas vapor mixture at the stages to condense the vapors and cooling the compressed mixture to a low temperature, and means to wash the cooled compressed gas vapor mixture to remove the condensate in the form of a fog, substantially as described.

14. An apparatus for separating vaporized volatile liquids from gaseous mixtures, having, in combination, means for compressing the gas vapor mixture, means for cooling the compressed gas vapor mixture to condense vapors, means to expand the compressed purified gas against pistons in a plurality of stages to do work and utilize the expanded gas to absorb heat taken from the gas vapor mixture, and means to connect the pistons with the compressing means to utilize the work of expansion in the compression, substantially as described.

15. An apparatus for separating vaporized volatile liquids from gaseous mixtures, having, in combination, means for cooling and condensing the gas vapor mixture before compression thereof to remove the easily condensable portion of the gas, means for compressing the residue of the gas vapor mixture, and means for supercooling the compressed residue to separate further vapors, substantially as described.

16. An apparatus for separating vaporized volatile liquids from gaseous mixtures, having, in combination, means for compressing gas vapor mixture in a plurality of stages, means for cooling the compressed gas vapor mixture at each stage, means to refrigerate the gas at each stage to condense vapors, and means to collect the condensed vapors from the different stages, substantially as described.

17. An apparatus for separating vaporized volatile liquids from gaseous mixtures, having, in combination, means for compressing the gas vapor mixture in a plurality of stages, means for cooling the compressed gas at each stage to condense vapors therefrom, means to expand the compressed purified gas in a plurality of stages, and means for conducting the expanded gas through the cooling means in a counter-current to the direction of flow of the compressed gas vapor mixture, substantially as described.

WALTER E. LUMMUS.

Witnesses:
FRANK E. LICHTENTHAELER,
WILLIAM J. DRUMMEY.